United States Patent [19]
Tarancon

[11] Patent Number: 6,010,605
[45] Date of Patent: Jan. 4, 2000

[54] NITROGEN TRIFLUORIDE PRODUCTION APPARATUS

[75] Inventor: Gregorio Tarancon, High Springs, Fla.

[73] Assignee: Florida Scientific Laboratories Inc., High Springs, Fla.

[21] Appl. No.: 08/773,137

[22] Filed: Dec. 26, 1996

Related U.S. Application Data

[63] Continuation of application No. 08/544,073, Oct. 17, 1995, Pat. No. 5,628,894.

[51] Int. Cl.$^7$ ..................................................... C25C 3/00
[52] U.S. Cl. .......................... 204/246; 205/359; 204/247
[58] Field of Search ................................. 204/241, 247, 204/246; 205/359

*Primary Examiner*—Kathryn Gorgos
*Assistant Examiner*—Thomas H. Parsons
*Attorney, Agent, or Firm*—Ezra Sutton

[57] ABSTRACT

Apparatus is disclosed for the production of nitrogen trifluoride ($NF_3$), starting with an anhydrous molten flux including ammonia ($NH_3$), a metal fluoride (MF), and hydrogen fluoride (HF). The apparatus includes an electrolyzer, an ammonia solubilizer, a hydrogen fluoride solubilizer, a nitrogen trifluoride reactor, two compressors, two pumps, three condensers a gas recycle loop, and, two flux loops of the same component ternary flux, but each loop with different concentration.

17 Claims, 9 Drawing Sheets

NITROGEN TRIFLUORIDE PRODUCTION APPARATUS

CROSS-REFERENCES TO RELATED APPLICATIONS

This application is a continuation of U.S. application Ser. No. 08/544,073, filed Oct. 17, 1995 now U.S. Pat. No. 5,628,894.

FIELD OF THE INVENTION

This invention relates to an apparatus for producing nitrogen trifluoride ($NF_3$) by using ammonia ($NH_3$) and hydrogen fluoride (HF) in an anhydrous liquid medium molten flux containing ammonia, a metal fluoride, and hydrogen fluoride.

BACKGROUND OF THE INVENTION

Nitrogen trifluoride ($NF_3$) is a colorless gas under normal conditions and has a boiling point of about minus (−)129° C. (degrees centigrade), and a melting point of about minus (−)208° C. (degrees centigrade). Nitrogen trifluoride ($NF_3$) is an oxidizer that is thermodynamically stable at elevated temperatures. At temperatures up to about 350° C. (degrees centigrade), its reactivity is comparable to oxygen. At higher temperatures, its reactivity is similar to fluorine owing to appreciable dissociation into $NF_2^+$ and $F^-$. The thermal dissociation of nitrogen trifluoride ($NF_3$) has been found to peak in the temperature range of 800° C. to 1200° C. (degrees centigrade). Nitrogen trifluoride ($NF_3$) acts primarily upon the elements as a fluorinating agent, but not a very active one at lower temperatures. At elevated temperatures, $NF_3$ pyrolysis with many elements to produce dinitrogen tetrafluoride ($N_2F_4$) and the corresponding fluoride. The pyrolysis of nitrogen trifluoride ($NF_3$) over copper turnings produces dinitrogen tetrafluoride ($N_2F_4$) in a 62–71% yield at 375° C. (degrees centigrade). Pyrolysis over carbon is more favorable. Hydrogen reacts with nitrogen trifluoride ($NF_3$) with the rapid liberation of large amounts of heat and is the basis for the use of nitrogen trifluoride ($NF_3$) in high-energy chemical lasers. The flammability range for nitrogen trifluoride and hydrogen ($NF_3/H_2$) mixture is 9.4–95 mole % of $NF_3$. Nitrogen trifluoride ($NF_3$) reacts with organic compounds, but generally an elevated temperature is required to initiate the reaction. Under these conditions, the reaction will often proceed explosively and great care must be exercised when exposing nitrogen trifluoride ($NF_3$) to organic compounds. Therefore, nitrogen trifluoride ($NF_3$) has found little use as a fluorinating agent for organic compounds.

Nitrogen trifluoride ($NF_3$) has been used successfully in large quantities as a fluorine source for high energy chemical lasers. It is preferred over fluorine because of its comparative ease of handling at ambient conditions. Nitrogen trifluoride ($NF_3$) has been used as a source of fluorine in the preparation of fluoro-olefins, and as an oxidizer for high energy level. Recently, an increasing amount of nitrogen trifluoride ($NF_3$) is being used in the semiconductor industry as a cleaning agent and as a dry etchant, showing significantly higher etching rates and selectivities when compared to carbon tetrafluoride ($CF_4$) and mixtures of carbon tetrafluoride ($CF_4$) and oxygen ($O_2$). It is used to clean semiconductor micro chips and silicon wafers. Minor amounts of nitrogen trifluoride ($NF_3$) are used as a chemical intermediate in the production of tetrafluorohydrazine ($N_2F_4$) and a series of perfluoroammonium salts. Nitrogen trifluoride ($NF_3$) was also used as an oxidizer in rocketry in the early 1960's, but this application was not commercialized.

There remains a need for an efficient manufacturing apparatus for the continuous production and generation of nitrogen trifluoride ($NF_3$) while producing no by-products.

DESCRIPTION OF THE PRIOR ART

Various apparatus and methods of producing nitrogen trifluoride ($NF_3$) have been disclosed in the prior art. For example, U.S. Pat. No. 4,091,081 and 4,156,598 to Woytek et al disclose the use of a molten ammonium acid mineral fluoride and contacting it with fluorine to make nitrogen trifluoride ($NF_3$). The process produces the by-product ammonium fluoride ($NH_4F$). Also, fluorine ($F_2$) and ammonia ($NH_3$) are mixed in the same vessel producing two high-temperature exothermic reactions. U.S. Pat. No. 4,804,447 to Sartori discloses the use of salts of ammonia and a salt of hydrazine in an electrolysis process that yields nitrogen trifluoride ($NF_3$) and hydrogen fluoride (HF). U.S. Pat. No. 4,975,259 to Hyakutake et al discusses the electrolysis of ammonium acid mineral fluoride or $KF/NH_4F/HF$ to make nitrogen trifluoride ($NF_3$) and hydrogen ($H_2$). It also employs helium (He) as a carrier gas.

These prior art patents use different apparatus as compared to the present invention. Also, none of the prior art patents disclose an apparatus having ammonia and hydrogen fluoride solubilizers in conjunction with a fluorine electrolyzer, a nitrogen trifluoride reactors, and condensers or a process for producing nitrogen trifluoride ($NF_3$) which is commercialized, and hydrogen fluoride (HF) which is recycled in the process. None of the prior art discloses an apparatus that operates under a positive pressure of 1 to 10 atm. None of the prior arts discloses an apparatus with a gas recycle loop (Helium-Fluorine-Nitrogen trifluoride). None of the prior arts discloses an apparatus with two flux loops of the same components ternary flux, but each loop with different concentration. In the nitrogen trifluoride flux loop the molar ratio of ammonia/potassium fluoride ($NH_3/KF$) is the same as the molar ratio of potassium fluoride/ammonia ($KF/NH_3$) in the fluorine flux loop.

Accordingly, it is an object of the present invention to provide an efficient apparatus for continuously and automatically producing nitrogen trifluoride ($NF_3$) from ammonia ($NH_3$) and hydrogen fluoride (HF) using a single molten flux.

Another object of the present invention is to provide an apparatus that can operate with one flux loop or with two flux loops. In the case of a single flux loop, the same control as in two flux loops intervenes.

Another object of the present invention is to provide an apparatus that operates in a two flux loop mode. The nitrogen trifluoride flux loop can operate under pressure. The best range of pressure for the nitrogen trifluoride flux loop is about 1 to 10 atm. The fluorine flux loop operates at a low pressure of about 1 atm.

Another object of the present invention is to provide an apparatus that operates with a two flux loop mode, in which the nitrogen trifluoride flux loop operates with an ammonia molar concentration<than ⅓ of the fluorine molar concentration, during the retention time of reaction. It normally operates under a pressure of 1 to 10 atm. but is not limited to this range, and operates in a temperature range of 100 to 200° C. (degrees centigrade), preferably 130 to 160° C. (degrees centigrade). The nitrogen trifluoride is free of other nitrogen fluorides.

Another object of the present invention is to provide a nitrogen trifluoride reactor having a single or multi-gas distributor plate. The distributor plate is made of material such as nickel plate perforate, porous sintered nickel plate, porous sintered nickel sparger, Teflon (polytetrafluoroethylene) plate perforate, or wire mesh. The gas is distributed and bubbled into the flux. The number of distributors is a minimum of one but the most convenient is 5 to 10 distributors. The reactor section between the distributor can be empty of packing material or fill of packing to increase the retention time and change the two phase flow path. The packing increases the path length which is a function of the packing size and type. Some of the packing used in this invention are Nutter rings and Protruded.

Another object of the present invention is to provide an apparatus that has the capacity to remove traces of moisture from the flux. The operating flux in the production of nitrogen trifluoride ($NF_3$) is anhydrous flux.

Another object of the present invention is to provide an apparatus that is continuous, controllable and automated such that the nitrogen trifluoride ($NF_3$) is obtainable without product deterioration (a high quality product is produced) and without any by-products being produced since they are undesirable.

Another object of the present invention is to provide a high purity and high quality nitrogen trifluoride ($NF_3$) which is free from contaminates and impurities such as dinitrogen difluoride ($N_2F_2$), tetrafluorohydrazine ($N_2F_4$), and nitrogen oxides ($NO_x$), by using an apparatus that operates under a preferable pressure in the range of 1 to 10 atm., a preferable temperature in the range of 130 to 160° C. (degrees centigrade), and an anhydrous ternary flux.

Another object of the present invention is to provide a system including an electrolyzer, a reactor vessel and solubilizers connected together so that a liquid molten flux flows through them continuously, and wherein ammonia ($NH_3$) and hydrogen fluoride (HF) are supplied to the system and nitrogen trifluoride ($NF_3$) is produced by the system.

Another object of the present invention is to provide an anhydrous molten flux containing ammonia ($NH_3$), a metal fluoride (MF) such as potassium fluoride (KF), and hydrogen fluoride (HF). The molar ratios being approximately ($NH_3$+MF):HF::4:10, respectively.

Another object of the present invention is to provide an apparatus for the production of nitrogen trifluoride ($NF_3$) capable of operating under pressure to prevent byproduct formation such as dinitrogen difluoride ($N_2F_2$) and tetrafluorohydrazine ($N_2F_4$). The preferable operating pressure range is between 1 to 10 atm., and for the temperature 130 to 160° C. (degrees centigrade).

Another object of the present invention is to provide an apparatus for the production of nitrogen trifluoride ($NF_3$) with the flexibility to operate in more than one mode: a single integrated loop mode or a two loop mode for the flux. In the single loop mode the flux from the ammonia solubilizer flows to the reactor, from the reactor the flux flows to the hydrogen fluoride solubilizer, from the hydrogen fluoride solubilizer the flux flows to the electrolyzer, and from the electrolyzer the flux flows to the ammonia solubilizer. In the two loop mode the flux flows: (A) The flux flows from the ammonia solubilizer to the reactor and from the reactor to the ammonia solubilizer; and (B) The flux flows from the electrolyzer to the hydrogen fluoride solubilizer and from the hydrogen fluoride solubilizer to the electrolyzer.

Another object of the present invention is to provide an apparatus with a compressor to pressurize the fluorine ($F_2$) from the electrolyzer into a receiver to operate the reactor under positive pressure.

Another object of the present invention is to provide an apparatus with a compressor to pressurize the nitrogen trifluoride ($NF_3$) produced in the reactor before it is condensed in the cryogenic condenser.

Another object of the present invention is to provide an apparatus with two loops, and in each loop a pump to recycle the flux. The fluorine loop recycles between the hydrogen fluoride solubilizer and the electrolyzer; the nitrogen trifluoride loop recycles between the ammonia solubilizer and the nitrogen trifluoride reactor.

Another object of the present invention is to provide an apparatus that produces nitrogen trifluoride ($NF_3$) with inert gas (the inert gas is recycled through the apparatus).

SUMMARY OF THE INVENTION

In accordance with the present invention there is provided an improved and efficient apparatus for the production of nitrogen trifluoride ($NF_3$), starting with an anhydrous molten flux including ammonia ($NH_3$), a metal fluoride (MF), and hydrogen fluoride (HF). The apparatus includes an electrolyzer, an ammonia solubilizer, a hydrogen fluoride solubilizer, a nitrogen trifluoride reactor, two compressors, two pumps, and three condensers. The electrolyzer has a first section for receiving the molten flux and has at least one cathode for producing hydrogen ($H_2$) gas, and has at least one anode for producing fluorine ($F_2$) gas and small amounts of nitrogen fluoride. The electrolyzer also includes a second section for collecting hydrogen ($H_2$) gas and a third section for collecting fluorine ($F_2$) gas. The ammonia solubilizer has a molten flux tank with first inlet means connected to the electrolyzer vessel for receiving the molten flux therefrom, the molten flux tank having first outlet means connected to the nitrogen trifluoride reactor for transferring the molten flux to the nitrogen trifluoride reactor, the ammonia solubilizer having second inlet means for receiving ammonia ($NH_3$), and having third inlet means for receiving circulating flux from the pump and from the nitrogen trifluoride reactor. The hydrogen fluoride solubilizer has a molten flux tank with first inlet means connected to the nitrogen trifluoride reactor for receiving the molten flux therefrom. The molten flux tank has first outlet means connected to the electrolyzer vessel for transferring the molten flux to the electrolyzer vessel. The hydrogen fluoride solubilizer has second inlet means for receiving hydrogen fluoride (HF), has a second inlet means for receiving the recycled helium (He) gas, a third inlet for receiving hydrogen fluoride (HF) from condensation, and an inlet for the recycle from the pump. The nitrogen trifluoride reactor has a molten flux tank with first inlet means connected to the first outlet means of the ammonia solubilizer for receiving the molten flux therefrom. The molten flux tank has first outlet means connected to the first inlet means of the hydrogen fluoride solubilizer for transferring the molten flux thereto. The nitrogen trifluoride reactor has second inlet means connected to the compressor for receiving fluorine ($F_2$) gas. The second inlet means includes means for simultaneously supplying the fluorine ($F_2$) gas and the carrier helium (He) gas to the nitrogen trifluoride reactor. The second outlet means supplies nitrogen trifluoride ($NF_3$) produced in the nitrogen trifluoride reactor to a condenser for the recovery of nitrogen trifluoride ($NF_3$) and hydrogen fluoride (HF) gases.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 1A is a schematic view of the nitrogen trifluoride apparatus of the present invention showing all major components and having an integrated single flux loop;

DETAILED DESCRIPTION OF THE APPARATUS

OVERVIEW

Figure 1:
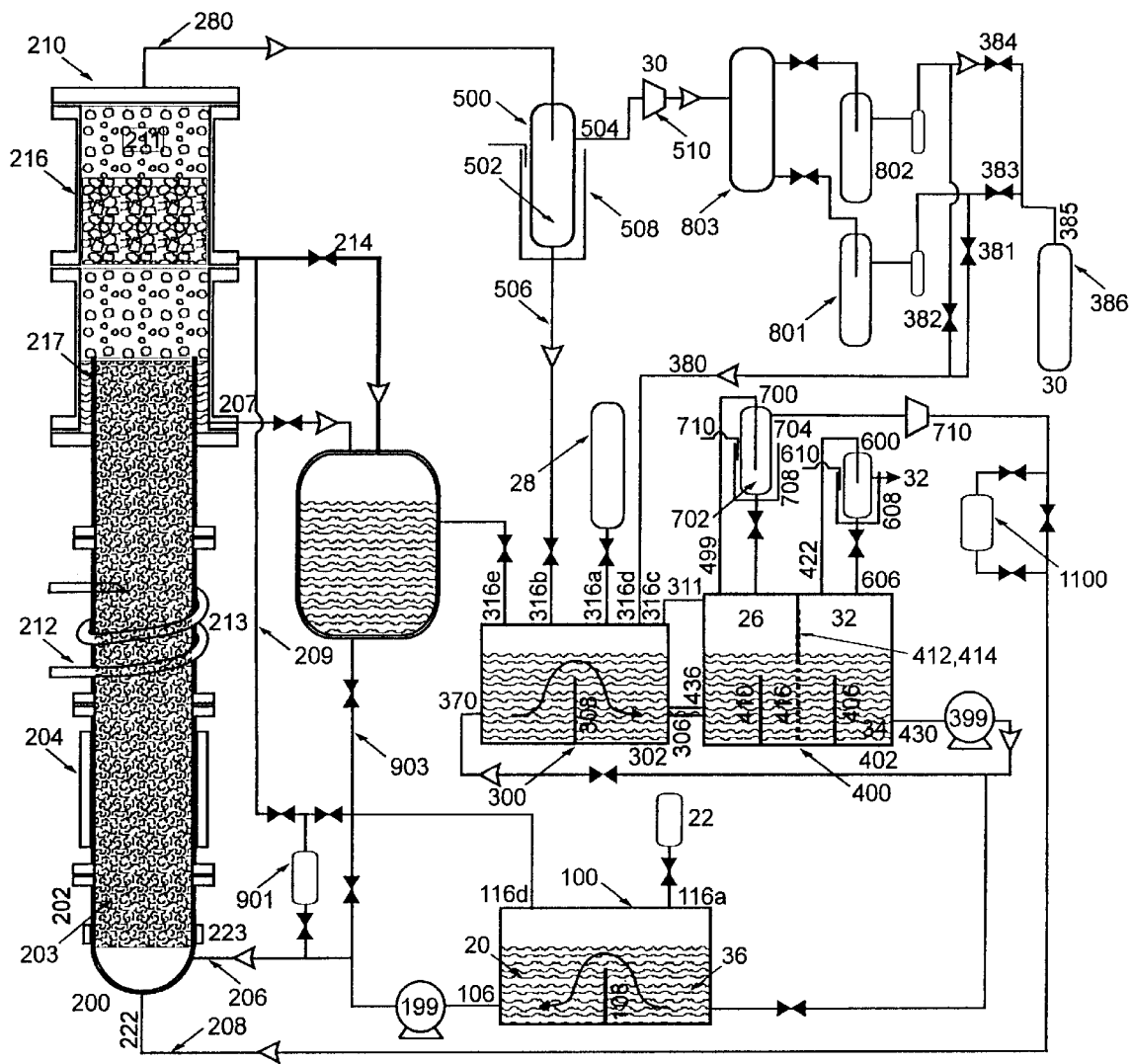
FIG. 1 is a schematic view of the nitrogen trifluoride apparatus of the present invention with all major components being shown.

FIG. 1 shows the apparatus 10. The apparatus 10 of the present invention includes the following major components for producing nitrogen trifluoride ($NF_3$) gas 30: an ammonia solubilizer 100, a nitrogen trifluoride reactor 200, a hydrogen fluoride solubilizer 300, an electrolyzer 400, a condenser 500 for the removal of hydrogen fluoride (HF) gas 28 from nitrogen trifluoride ($NF_3$) gas 30, a condenser 600 for the removal of hydrogen fluoride (HF) gas 28 from hydrogen ($H_2$) gas 32, a condenser 700 for the removal of hydrogen fluoride (HF) gas 28 from fluorine ($F_2$) gas 26, a compressor 710 to pump fluorine ($F_2$) gas 26 from 0 psig to 100 psig, and a nitrogen trifluoride compressor 510 to pump nitrogen trifluoride ($NF_3$) gas 30 from the reactor pressure to 100 psig.

As will be explained herein, a molten flux 20 is circulated continuously through the solubilizer 100 and the reactor 200 solubilizer 300, and electrolyzer 400. The quantity of molten flux 20 being circulated is maintained substantially constant by adding ammonia ($NH_3$) gas 22 to the ammonia solubilizer 100 and by adding hydrogen fluoride (HF) gas 28 to the hydrogen fluoride solubilizer 300, as they are consumed.

The gaseous mixture containing nitrogen trifluoride ($NF_3$) gas 30 ispumped by compressor 510 into holding tank 802. The gaseous mixture is fed to cryogenic trap 801 and the incondensable helium (He) gas 24 is transferred back to the hydrogen fluoride solubilizer 300 via valving 381 or valving 382 through pipe 380. After the nitrogen trifluoride ($NF_3$) gas 30 is collected in holding tank 802, the nitrogen trifluoride ($NF_3$) gas 30 is vaporized and transferred via valving 383 or valving 384 through pipe 385 to the cylinders 386.

The helium (He) gas 24 carries the fluorine ($F_2$) gas 26 from electrolyzer 400, and gaseous mixture containing fluorine ($F_2$) gas 26 is pumped by compressor 710 into tank 1100. The gaseous mixture from tank 1100 is fed into the react or 200 via pipe 208.

The electrolyzer 400 produces fluorine ($F_2$) gas 26 and hydrogen ($H_2$) gas 32, and supplies the fluorine ($F_2$) gas 26 to the reactor 200 to react with the molten flux 20 containing ammonia ($NH_3$) gas 22 therein to produce nitrogen trifluoride ($NF_3$) gas 30. The nitrogen trifluoride ($NF_3$) gas 30 carries hydrogen fluoride (HF) gas 28 which is collected at condenser 500. The clean nitrogen trifluoride ($NF_3$) gas 30 is pumped by the compressor 510 to the condenser 803.

Figure 1A:
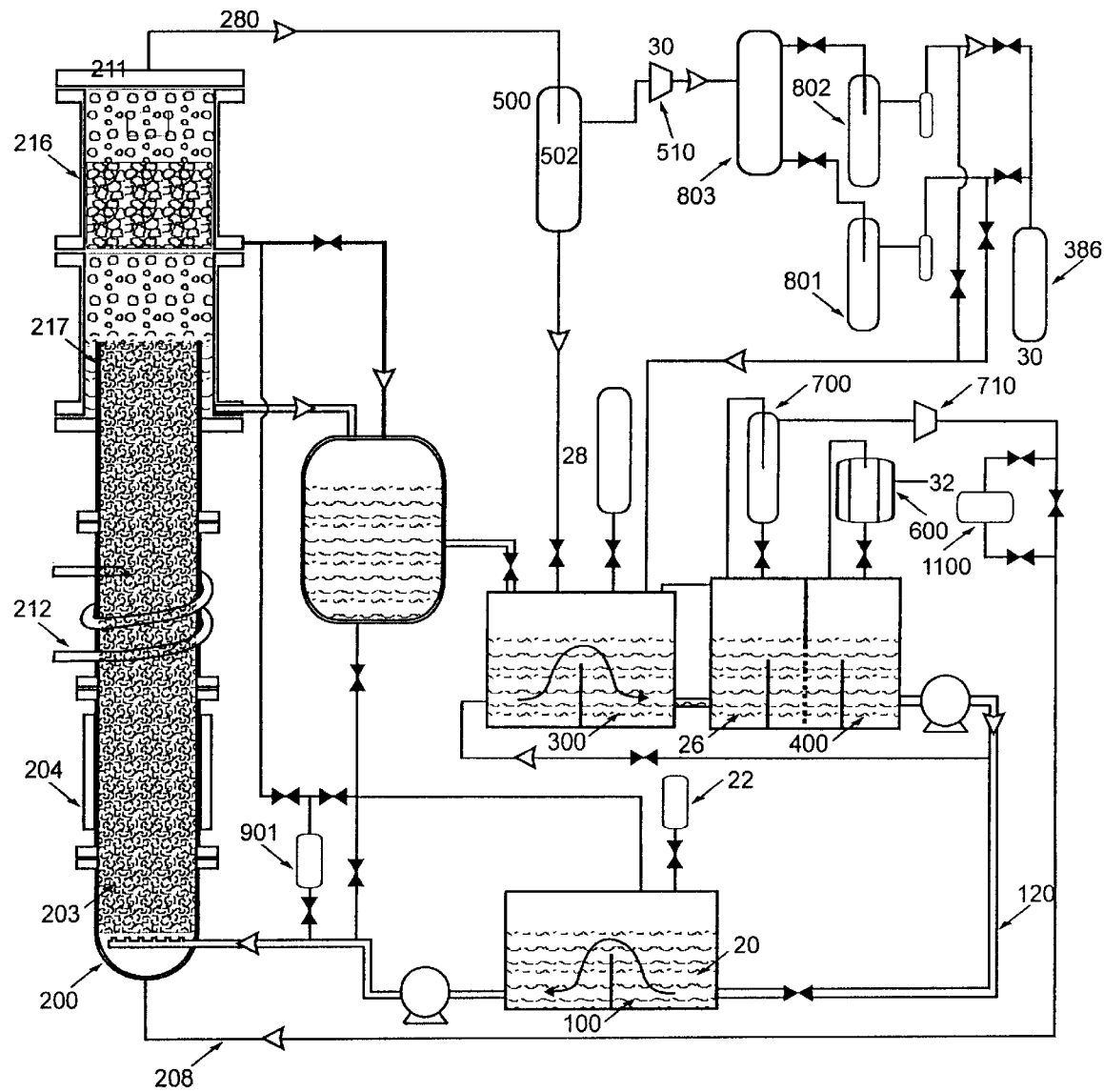
FIG. 1A shows the integrated single flux loop, and in FIG. 1B the flux divides into two loops.

FIG. 1A shows the path of the molten flux 20 by using the integrated single flux loop 120 mode of operation. The integrated single flux loop 120 requires the recycle bypass around the hydrogen fluoride solubilizer 300 and the electrolyzer 400; and recycle bypass around the ammonia solubilizer 100 and the reactor 200.

Figure 1B:
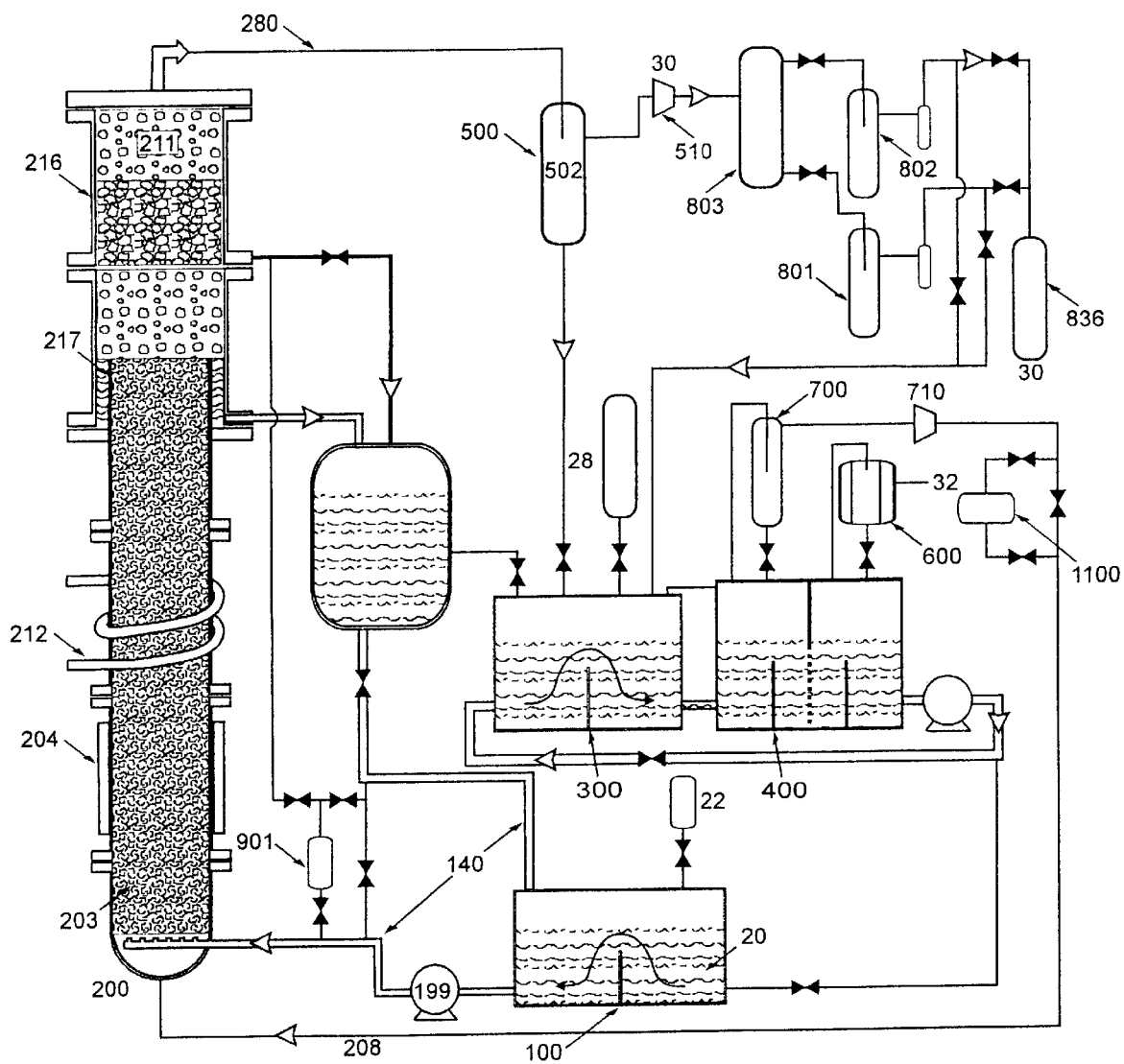
FIG. 1B is a schematic view of the nitrogen trifluoride apparatus of the present invention showing all major components and having two flux loops.

FIG. 1B shows the path of the molten flux 20 by using the two integrated flux loops 140 and 160, mode of operation. The two flux loops 140 and 160 circulate a first flux loop 140 between the ammonia solubilizer 100 and the reactor 200, with recycle in the ammonia solubilizer, and circulate the second flux loop 160 between the hydrogen fluoride solubilizer 300 and the electrolyzer 400. By using the two flux loops 140 and 160 the composition of the molten flux 20 within each of the loops 140 and 160 can easily be controlled.

AMMONIA SOLUBILIZER 100

Figure 2:
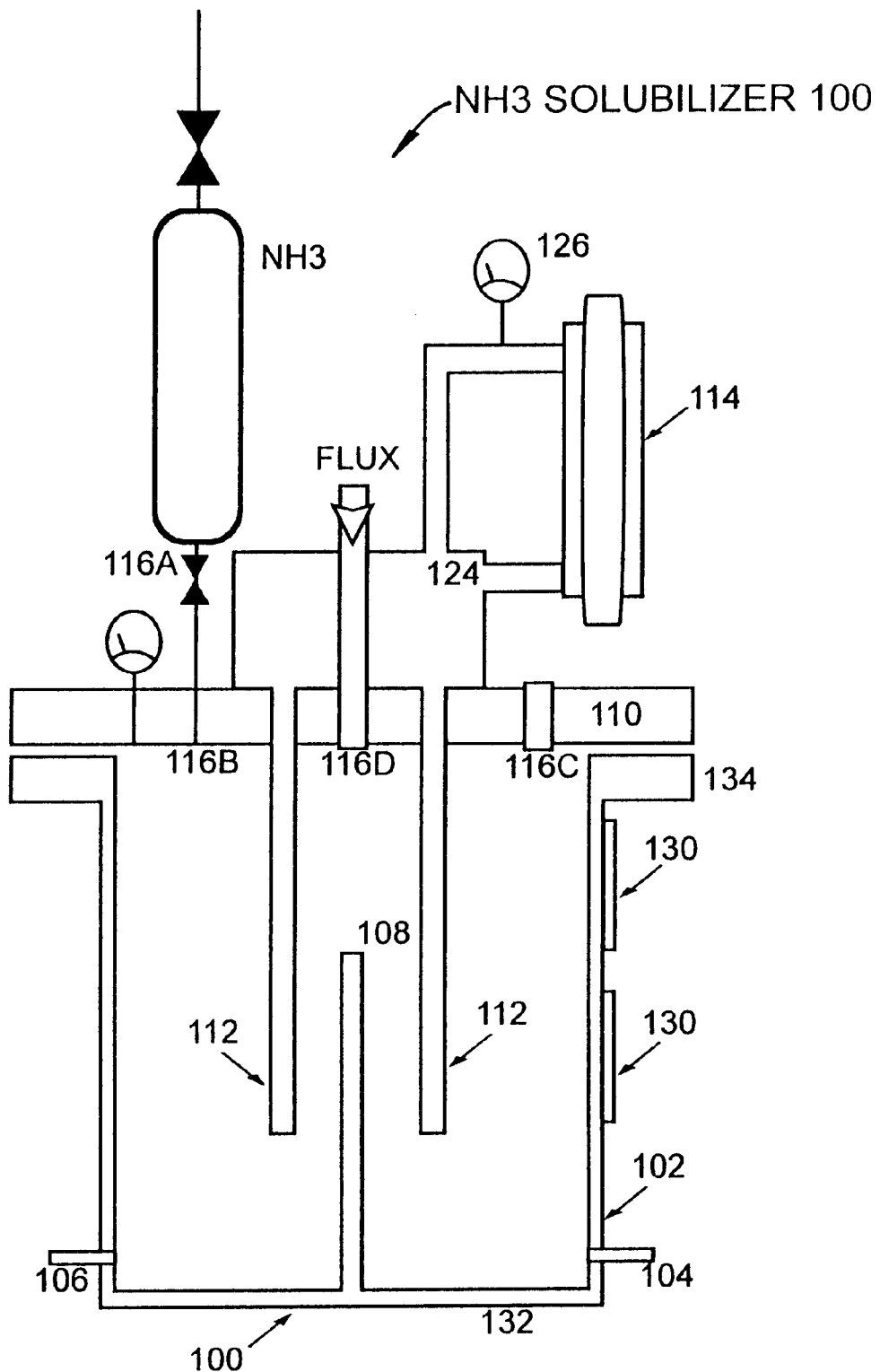
FIG. 2 is a cross-sectional view of the ammonia solubilizer with all major component parts being shown therein.

As shown in FIG. 2, the ammonia solubilizer 100 includes a molten flux tank 102, having an inlet pipe 104 and outlet pipe 106. Molten flux 20 is received from the electrolyzer 400 through the inlet pipe 104. The molten flux tank 102 has a baffle 108 for increasing the mixing contact between the molten flux 20 and the ammonia ($NH_3$) gas 22, and it increases the heat transfer ($\Delta H_t$) of the molten flux 20 and the cooling tubes 112. Molten flux 20 is recirculated by using pump 199 between outlet pipe 106 and inlet pipe 116d.

The ammonia solubilizer 100 has a cover 110 having cooling tubes 112 extending downwardly therefrom. The bundle of U-shaped cooling tubes 112 are used to provide the removal of excess heat from the molten flux 20. As ammonia ($NH_3$) gas 22 is added to the molten flux 20, the absorption creates heat, and the cooling tubes 112 remove the heat of absorption of ammonia ($NH_3$) gas 22 in the molten flux 20, also referred to as heat of solution ($\Delta H_s$). Each cooling tube 112 acts as an evaporator. The vapor formed on each cooling tube 112 is released in the vapor chamber 124. Vapor chamber 124 is pressurized to 50 psig and has a pressure gauge 126 for monitoring the vapor chamber pressure. External condenser 114 is used to condensate the vapor produced by the cooling tubes 112.

The cover 110 of ammonia solubilizer 100 has four (4) connections that include an ammonia ($NH_3$) gas 22 introduction pipeline 116a, a pressure gauge 116b, a vent 116c, and a recycle loop 116d. The ammonia ($NH_3$) gas 22 is fed in the vapor phase to the molten flux 20 to enrich the molten flux 20 with ammonia ($NH_3$) gas 22 in the amount to the concentration selected.

When ammonia ($NH_3$) gas 22 is introduced through the pipeline connection 116a into the solubilizer 100, it is novel to recycle the molten flux in a closed recycle loop 116d. The ammonia ($NH_3$) gas 22 introduced through connection 116a enriches the mole fraction of the ammonia ($NH_3$) gas 22 content in the molten flux 20 in the range selected, which then flows to the nitrogen trifluoride reactor 200. All the heat of solution generated by the ammonia ($NH_3$) gas 22 addition in the solubilizer 100 is removed by cooling tubes 112. The molten flux 20 enriched with ammonia ($NH_3$) gas 22 flows through pipe line 106 into the nitrogen trifluoride reactor 200 at a proper temperature without excess heat.

The solubilizer 100 is made of a Monel 400 (nickel alloy) sleeve 12" in diameter and 24" in length. The sleeve is supported with a carbon steel cartridge made of carbon steel 12" standard pipe. The sleeve cartridge 102 has a bottom plate 132 and a slip-on flange 134 at the top. The slip-on flange 134 is joined with a 150 lb. blind flange 110 that serves as a cover for the solubilizer. The solubilizer tank 102 has three bottom connections of ¾" NPT where NPT refers to National Pipe Thread. The cooling pipes 112 are connected to the vapor chamber 124 in solubilizer 100. The tubing connections 116a to 116d in the solubilizer 100 are made of ¾" Monel tubing. There is a minimum of three tubing connections in solubilizer 100. The solubilizer 100 has an external electrical heating element 130 for the startup condition, and it is kept on standby for heat balancing of the nitrogen trifluoride system 10.

NITROGEN TRIFLUORIDE REACTOR 200

Figure 3:
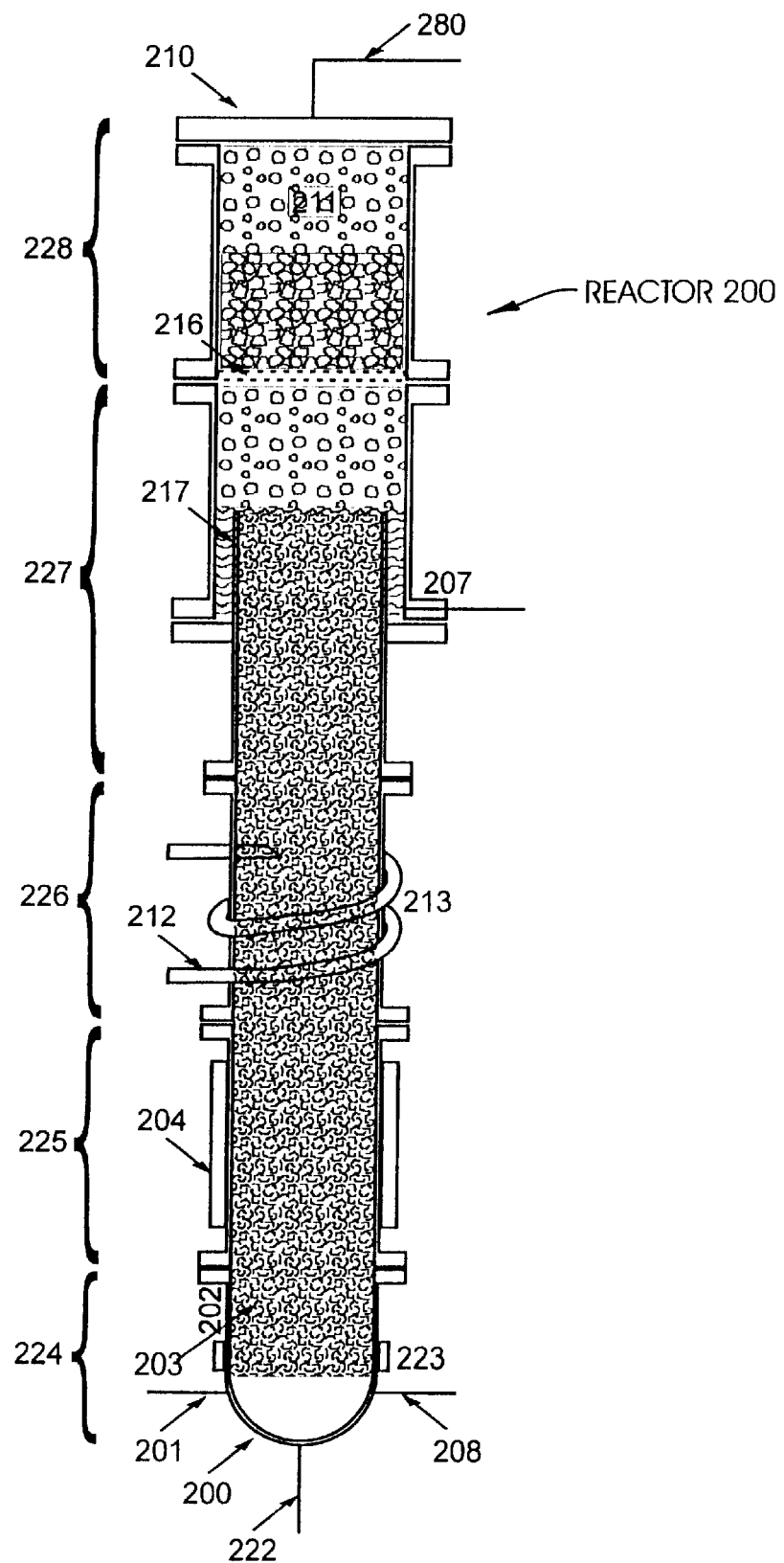
FIG. 3 is a cross-sectional view of the nitrogen trifluoride reactor with all major component parts being shown therein.

As shown in FIG. 3, the nitrogen trifluoride reactor 200 has a molten flux tank 202, having a flux inlet pipe 206, a flux outlet pipe 207, a gas inlet pipe 208, a gas inlet spare pipe 201, and gas outlet pipe 280. The molten flux 20 flows from the ammonia solubilizer 100 into the nitrogen trifluoride reactor 200 through inlet pipe 206. Tank 901 acts as an alternative method for metering the flux flow through inlet pipe 206. Gas from pipeline 209 is used to equalize the pressure in tank 901. The nitrogen trifluoride reactor 200 has a cooler 212 having a bundle of coils 213 or jacket section 213 extending around the body therefrom to provide the necessary cooling to the molten flux 20 in this zone. The heat of reaction of fluorine ($F_2$) gas 26 with the ammonia ($NH_3$) component 22 of the molten flux 20 to generate nitrogen trifluoride ($NF_3$) gas 30 is removed by the cooling effect of coil or jacket section 213. Each coil 213 constitutes the heat transfer element or jacket. The cooling medium used in this pilot plant is ethylene glycol.

Fluorine ($F_2$) gas 26 is injected from receiver 1100. The fluorine ($F_2$) gas 26 is injected in the bottom portion of reactor 200 via inlet pipe 208. The bottom portion 224 consists of 3" pipe 6" length with end pipe and flange. The bottom gas injection section 224 has the fluorine inlet pipe 208 and drain pipe 222. The injection section 224 has a heating band 223.

The body of reactor 200 is divided into four packing sections 225, 226, 227, and 228. The first reactor section 225 from the bottom has two sections of packing 203 with a gas liquid distributor between the two sections. There is an electrical heater 204 between the two sections. Section 226 is identical to section 225. Section 227 has the liquid/gas disengagement and a flux drain. The outside upper portion is of large diameter to carry the drainage 217 of the flux. The molten flux 20 exits through outlet pipe 207 and goes to the storage overflow tank 902. Gas from pipeline 214 is used to equalize tank 902. From the storage overflow tank 902 there is a pipe drain 903 that drains the molten flux 20 to the ammonia solubilizer 100, and a pipe drain 904 that drains the molten flux 20 to the hydrogen fluoride solubilizer 300. Finally, section 228 is the demister section with large diameter packing to stop any mist from the two phase flow of gas/liquid. The mist eliminator 211 is located at the top of section 228 and is supported by a wire mesh support 216.

Nitrogen trifluoride ($NF_3$) as 30 is produced in the molten flux 20, and it flows up to the top of the reactor 200. The helium (He) gas 24 concentration is in the range of 5 to 70% by volume. Once the nitrogen trifluoride ($NF_3$) gas 30 is passed through the nitrogen trifluoride/hydrogen fluoride condenser 500 the hydrogen fluoride (HF) gas 28 is removed. The helium (He) gas 24 is removed by passing the gas mixture of nitrogen trifluoride ($NF_3$) gas 30 and helium (He) gas 24 through the liquid nitrogen condenser 803. Helium (He) gas 24 with traces of fluorine ($F_2$) gas 26 and nitrogen trifluoride ($NF_3$) gas 30 from condenser 803 is recycled back to the hydrogen fluoride solubilizer 300 through pipe line 380.

The molten flux tank 202 is a Monel tank with a diameter of 3" pipe schedule 10. This tank 202 has a cap 232 at the bottom and a flange 234 at the top. All of the wet parts of this vessel are made of Monel 400. The supports and holder for the tank 202 are made of carbon steel.

Cover 210 is made of flat Monel clad in a 150 lb. carbon steel blind flange. Cover 210 also has a connection of ¾" O.D.×0.083 wall Monel tubing. There are two ¼" connections for temperature sensors, and one ¾" connection for the nitrogen trifluoride ($NF_3$) gas stream 30 in outlet pipe 280 out of reactor 200.

HYDROGEN FLUORIDE SOLUBILIZER 300

Figure 4:
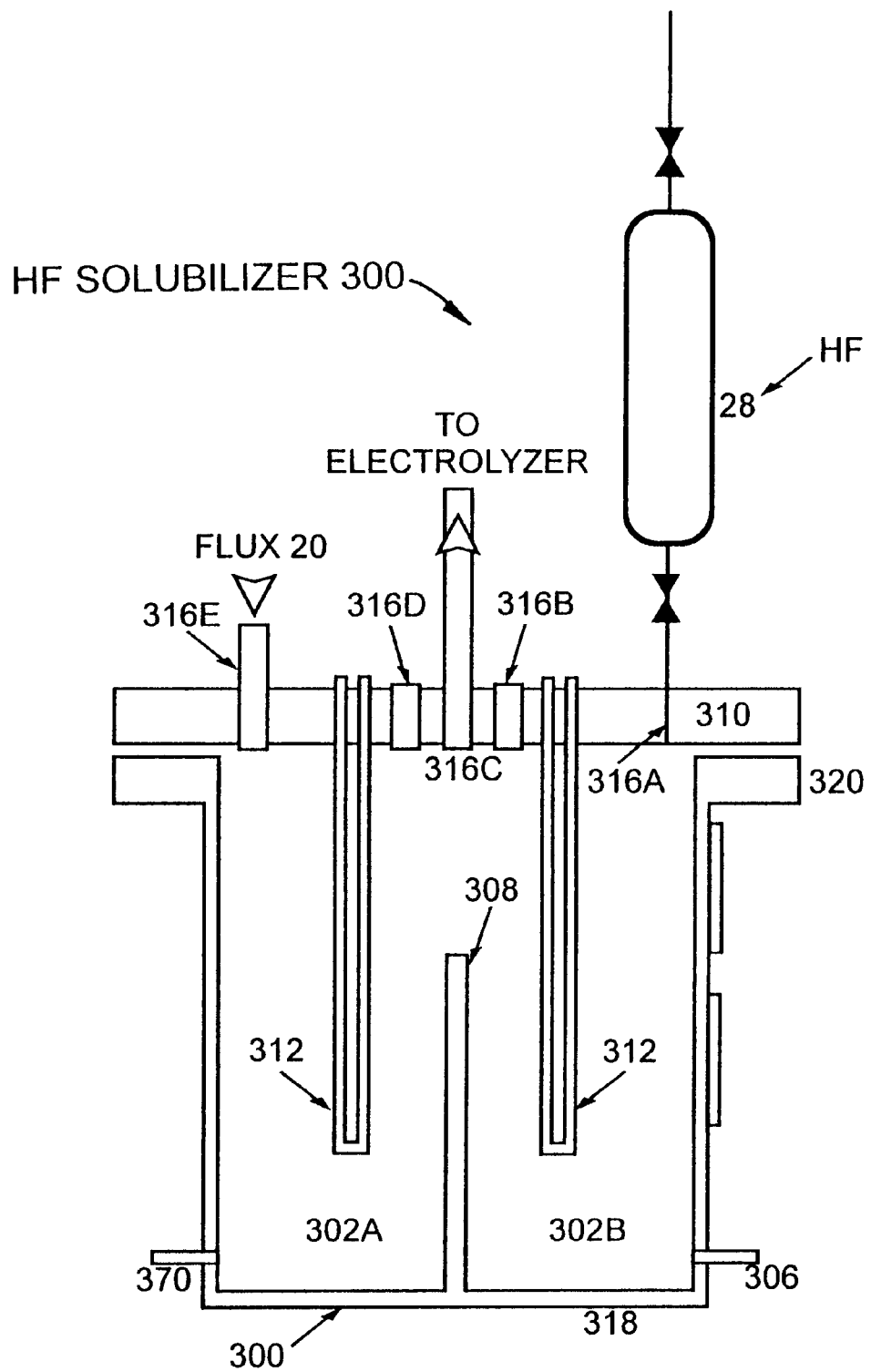
FIG. 4 is a cross-sectional view of the hydrogen fluoride solubilizer with all major component parts being shown therein.

As shown in FIG. 4, the hydrogen fluoride solubilizer 300 has a molten flux tank 302, having an inlet pipe 370 and an outlet pipe 306. Molten flux 20 is received from the nitrogen trifluoride reactor 200 through inlet pipe 316e. Molten flux tank 302 has a baffle 308 that divides tank 302 into two compartments, 302a and 302b which increase the mixing contact between molten flux 20 and hydrogen fluoride (HF) gas 28, and increases the heat transfer of molten flux 20 to the hydrogen fluoride (HF) gas 28. Baffle 308 provides for different and distinct temperature gradients of molten flux 20 within each compartment, 302a and 302b, of tank 302.

The hydrogen fluoride solubilizer 300 has a cover 310 having U-shaped cooling tubes 312 extending downwardly from the cover so that flux 20 passes through the U-shaped cooling tubes. Cooling tubes 312 are used for the removal of heat from molten flux 20 which brings the temperature of molten flux 20 from about 65° C. (degrees centigrade) to a set temperature of about 60° C. (degrees centigrade) to supply the electrolyzer 400. In addition, as hydrogen fluoride (HF) gas 28 is added to molten flux 20, the absorption creates heat, and cooling tubes 312 remove the heat of absorption ($\Delta H_s$), also referred to as heat of solution.

Cover 310 also includes five (5) connections, a connection 316a for hydrogen fluoride (HF) gas 28 introduction, a connection 316b for hydrogen fluoride (HF) gas 28 recycling from condenser 500, a connection outlet 316c for injecting helium (He) gas 24 from solubilizer 300 to electrolyzer 400, a connection 316d for hydrogen fluoride (HF) gas 28 and helium (He) gas 24 recycling from the cryogenic nitrogen trifluoride collectors 801 and 802 via pipeline 380, and molten flux 20 recycle from overflow storage tank 902 316e. Helium (He) gas 24 passes from solubilizer 300 to electrolyzer 400 via pipeline 311. The main functions of the hydrogen fluoride solubilizer 300 are to cool down the molten flux 20 and to enrich molten flux 20 with additional hydrogen fluoride (HF) gas 28 from condenser 500 and/or pipeline 380, as the hydrogen fluoride (HF) gas 28 is converted into fluorine ($F_2$) gas 26 and hydrogen ($H_2$) gas 32 by electrolytes which takes place in the electrolyzer 400. The solubilizer 300 is made of a Monel 400 sleeve 12" in diameter and 24" in length. The sleeve is supported with a carbon steel cartridge made of carbon steel 12" standard pipe. The sleeve cartridge has a bottom plate 318 and a slip-on flange 320 at the top. The slip-on flange 320 is joined with a 150 lb. blind flange 310 that serves as a cover 310 for the solubilizer. The solubilizer tank 302 has two bottom connections of ¾" NPT. The cooling pipes 312 are made of Monel 400. Each pipe is made using 1.5" Monel pipe that is 24" in length. There are six cooling pipes 312 in solubilizer 300. The connections in the top of solubilizer 300 are made of ¾" Monel tubing.

FLUORINE-HYDROGEN ELECTROLYZER 400

Figure 5A:
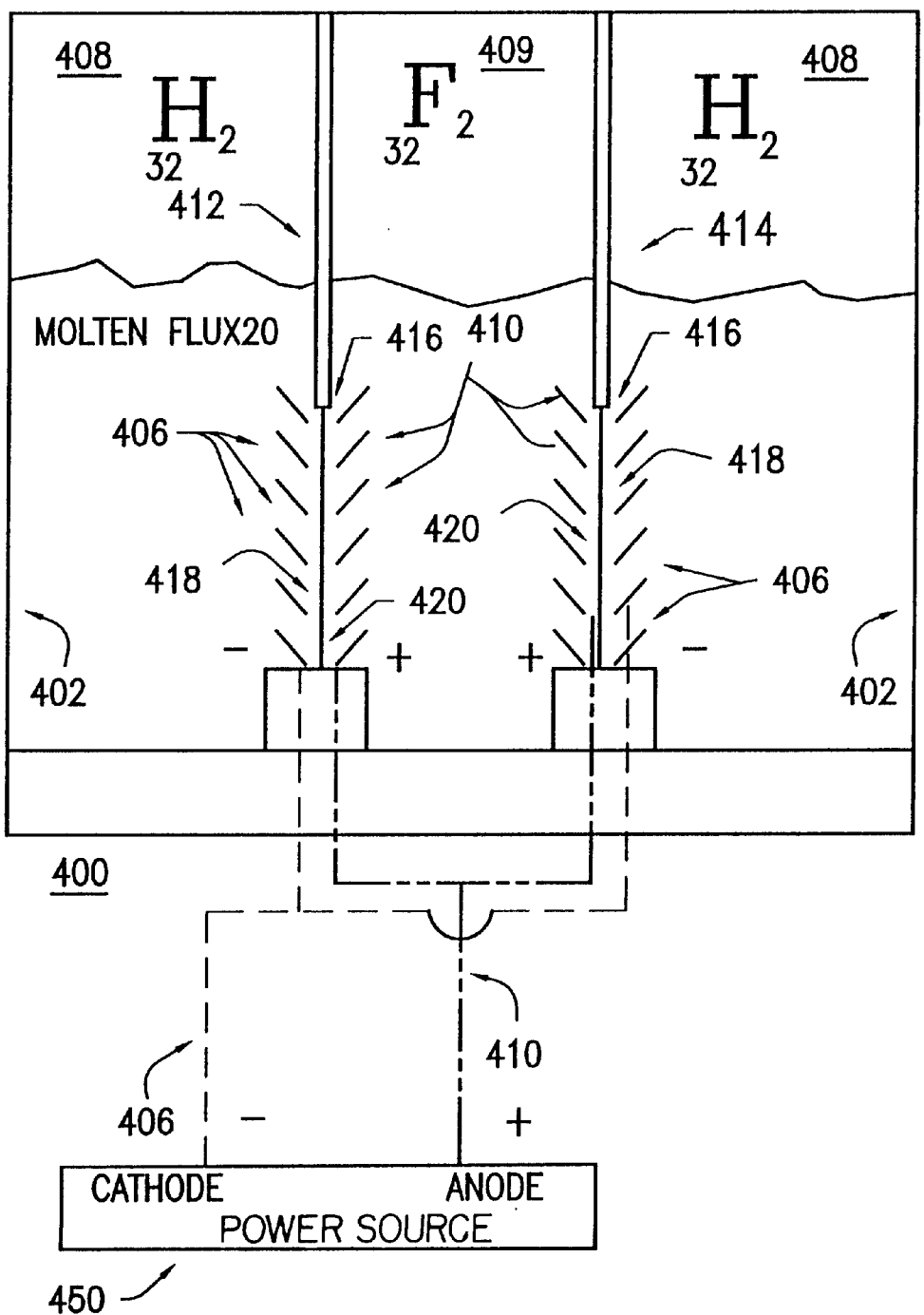
FIG. 5A is a cross-sectional view of the first embodiment of the electrolyzer with all major component parts being shown therein.
Figure 5B:
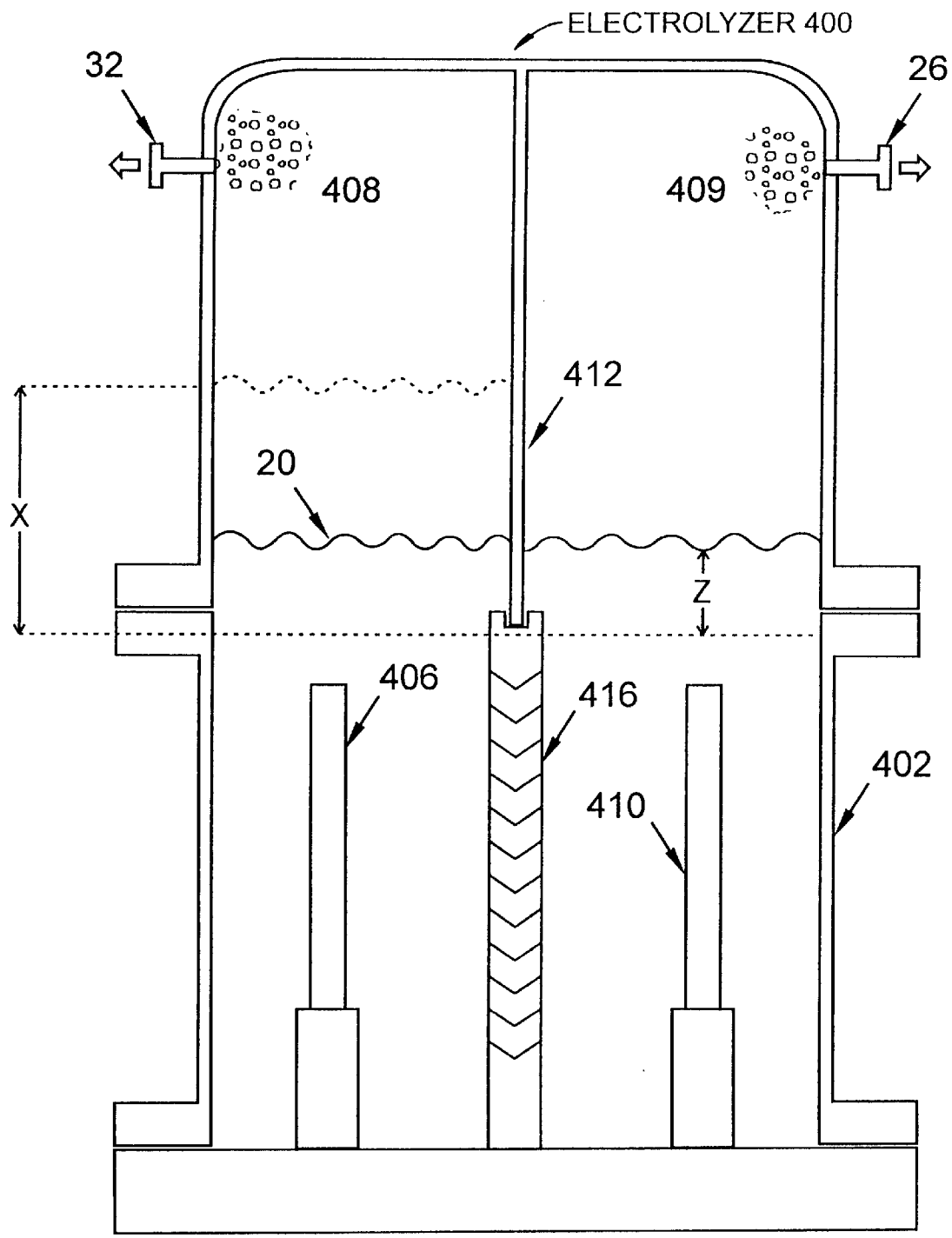
FIG. 5B is a cross-sectional view of the second embodiment of the electrolyzer with all major components parts being shown therein.

As shown in FIGS. 5A and 5B, the two solubilizers 100 and 300 are connected to electrolyzer 400. Hydrogen fluoride solubilizer 300 supplies molten flux 20 to the electrolyzer, and in return, the electrolyzer supplies molten flux 20 to ammonia solubilizer 100. The electrolyzer 400 and flux 20 used in the $NF_3$ process are made specifically for this process. Electrolyzer 400 operates at approximately 50 to 60°0 C. (degrees centigrade) with a hydrogen fluoride (HF) gas 28 concentration in the range of 70 to 74 mole %, with the balance of molten flux 20 containing ammonia ($NH_3$) gas 22 and potassium fluoride (KF) gas 34. The number of moles of ammonia ($NH_3$) gas 22 is less than or equal to the number of moles of potassium fluoride (KF) gas 34. Electrolyzer 400 is made of an ultra high molecular weight polyethylene; nickel is used for the anode 410; nickel or nickel-alloy is used for the cathode 406; and Teflon TEN (Tunnel Electron Net) is used for the membrane 416.

The fluorine-hydrogen electrolyzer 400 includes a first section being a molten flux tank 402 for holding the anhydrous molten flux 20. Section 402 also includes a plurality of cathodes 406 for producing hydrogen ($H_2$) gas 32, and a plurality of anodes 410 for producing fluorine ($F_2$) gas 26. Electrolyzer 400 further includes upper baffles 412 and 414 which define two upper hydrogen ($H_2$) gas 32 collecting sections 408 and an upper fluorine ($F_2$) gas 26 collecting section 409. Baffles 412 and 414 have a Teflon Tunnel Electron Net 416 attached to their lower ends for transferring anhydrous molten flux 20 between sections of the molten tank 402. The outer wall 418 of membrane 416 has the cathodes 406 connectedly attached, and conversely, the inner wall 420 of membrane 416 has the anodes 410 connectedly attached. Cathodes 406 and anodes 410 are connected to power source 450, as depicted in FIG. 5A of the drawings.

As shown in FIG. 1, electrolyzer 400 has outlet pipes 422 for hydrogen ($H_2$) gas 32 which is transferred to condenser 600, an outlet pipe 499 for fluorine ($F_2$) gas 26 which is transferred to reactor 200 via inlet pipe 208, and outlet pipe 430 having a circulating pump 399 for transferring the molten flux 20 to the ammonia solubilizer 100. Electrolyzer 400 also has an inlet pipe 436 for transferring the hydrogen fluoride (HF) gas 28 enriched molten flux 20 from hydrogen fluoride solubilizer 300 to the molten flux tank 402, and an inlet pipe 311 for the transfer of helium (He) gas 24 to the gaseous sections 408 and 409.

CONDENSERS 500, 600 AND 700

As shown in FIG. 1, the three condensers 500, 600, and 700 are made of Monel 400 and are essentially used for the removal of hydrogen fluoride (HF) 28 from the outlet gaseous streams via outlet pipes 280, 499 and 422. The condensers operate in the temperature range of minus (−) 60 to minus (−) 80° C. (degrees centigrade). These condensers 500, 600 and 700 are of a simple design being standard cylindrical vessels 502, 602, and 702 having cooling pipes 508, 608 and 708. These condensers 500, 600 and 700 have hydrogen fluoride (HF) 28 return lines 506, 606 and 706, center gas feed lines 280, 499 and 422, and top gas outlet lines 504, 604 and 704. Cooling vessels 508, 608 and 708 are filled from the top 510, 610 and 710 of each unit 500, 600, and 700 so that the units are cooled to the appropriate vessel temperature.

DETAILED DESCRIPTION OF THE NITROGEN TRIFLUORIDE PROCESS OPERATION

OVERVIEW

In the production of nitrogen trifluoride ($NF_3$) gas 30, as will be explained herein, a molten flux 20 is circulated continuously through the solubilizers 100 and 300, the reactor 200, and the electrolyzer 400, by using the two flux loops mode 140 and 160 in the description of apparatus operation. In flux loop 140 nitrogen trifluoride ($NF_3$) gas 30 is produced and in the other loop 160 fluorine ($F_2$) gas 26 is produced. The loop in which nitrogen trifluoride ($NF_3$) gas 30 is produced is designated as the nitrogen trifluoride loop 140, and the loop in which fluorine ($F_2$) gas 26 is produced is designated as the fluorine loop 160.

The nitrogen trifluoride flux loop 140 consists of the ammonia solubilizer 100 and the reactor 200. The nitrogen trifluoride loop 140 can operate under pressure, the preferable pressure range being between 1 to 10 atmospheres (atm). The nitrogen trifluoride flux loop 140 can operate with a molten flux 20 in which the ammonia ($NH_3$) gas 22 concentration is approximately three times the mole concentration of potassium fluoride (KF) gas 34. The nitrogen trifluoride flux loop 140 operates at a higher temperature compared to the fluorine flux loop 160. In the nitrogen trifluoride flux loop 140 a chemical reaction takes place to generate nitrogen trifluoride ($NF_3$) gas 30 and hydrogen fluoride (HF) gas 28.

The fluorine flux loop 160 consists of the hydrogen fluoride solubilizer 300 and the electrolyzer 400. The fluorine flux loop 160 operates at low pressure, approximately 1 atmosphere. The fluorine flux loop 160 operates with a molten flux 20 in which the concentration of ammonia ($NH_3$) gas 22 is about ⅓ the concentration of potassium fluoride (KF) gas 34. The fluorine flux loop 160 operates at a low temperature compared to the nitrogen trifluoride flux loop 140. The temperature in the fluorine flux loop 160 ranges around ½ to ⅓ the temperature in the nitrogen trifluoride flux loop 140. The fluorine flux loop 160 operates under an electrochemical process. Fluorine ($F_2$) gas 26 is generated by electrolysis.

The quantity of molten flux 20 being circulated is maintained substantially constant by adding ammonia ($NH_3$) gas 22 to the ammonia solubilizer 100, and by adding hydrogen fluoride (HF) gas 28 to the hydrogen fluoride solubilizer 300, as they are consumed. The molten flux 20 has a composition as follows:

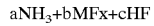

The molar ratio of ammonia ($NH_3$) gas 22 to metal fluoride (MFx) 34 to hydrogen fluoride (HF) 28 is approximately ($NF_3$+MF): HF::4:10 respectively.

The electrolyzer 400 produces ($F_2$) gas 26 and hydrogen ($H_2$) gas 32 and supplies fluorine ($F_2$) gas 26 to reactor 200 to react with the molten flux 20 contained therein to produce nitrogen trifluoride ($NF_3$) gas 30. The nitrogen trifluoride ($NF_3$) gas 30 is collected at cryogenic collectors 801 and 802.

The electrochemical reactions produced in the electrolyzer 400 for producing fluorine ($F_2$) gas 26 and hydrogen ($H_2$) gas 32 are as follows:

Cathode reaction: $2H^+ + 2e \rightarrow H_2$

Anode reaction: $2F^- - 2e \rightarrow F_2$ $2HF \rightarrow F_2 + H_2 + Heat$

In the nitrogen trifluoride reactor 200 the chemical reaction produced is as follows:

$NH_4F + 3F_2 \rightarrow NF_3 + 4HF + Heat$

The equation for the entire process is:

$NH_3 + 3HF \rightarrow NF_3 + 3H_2$

It should be noted that the ammonium fluoride ($NH_4F$), designated 36, is produced in the ammonia solubilizer 100 and then reacted with fluorine ($F_2$) gas 26 in reactor 200. The ammonium fluoride ($NH_4F$) 36 is produced by contacting ammonia ($NH_3$) gas 22 with the hydrogen fluoride (HF) gas 28 of the molten flux 20.

NITROGEN TRIFLUORIDE REACTOR 200

Figure 6:
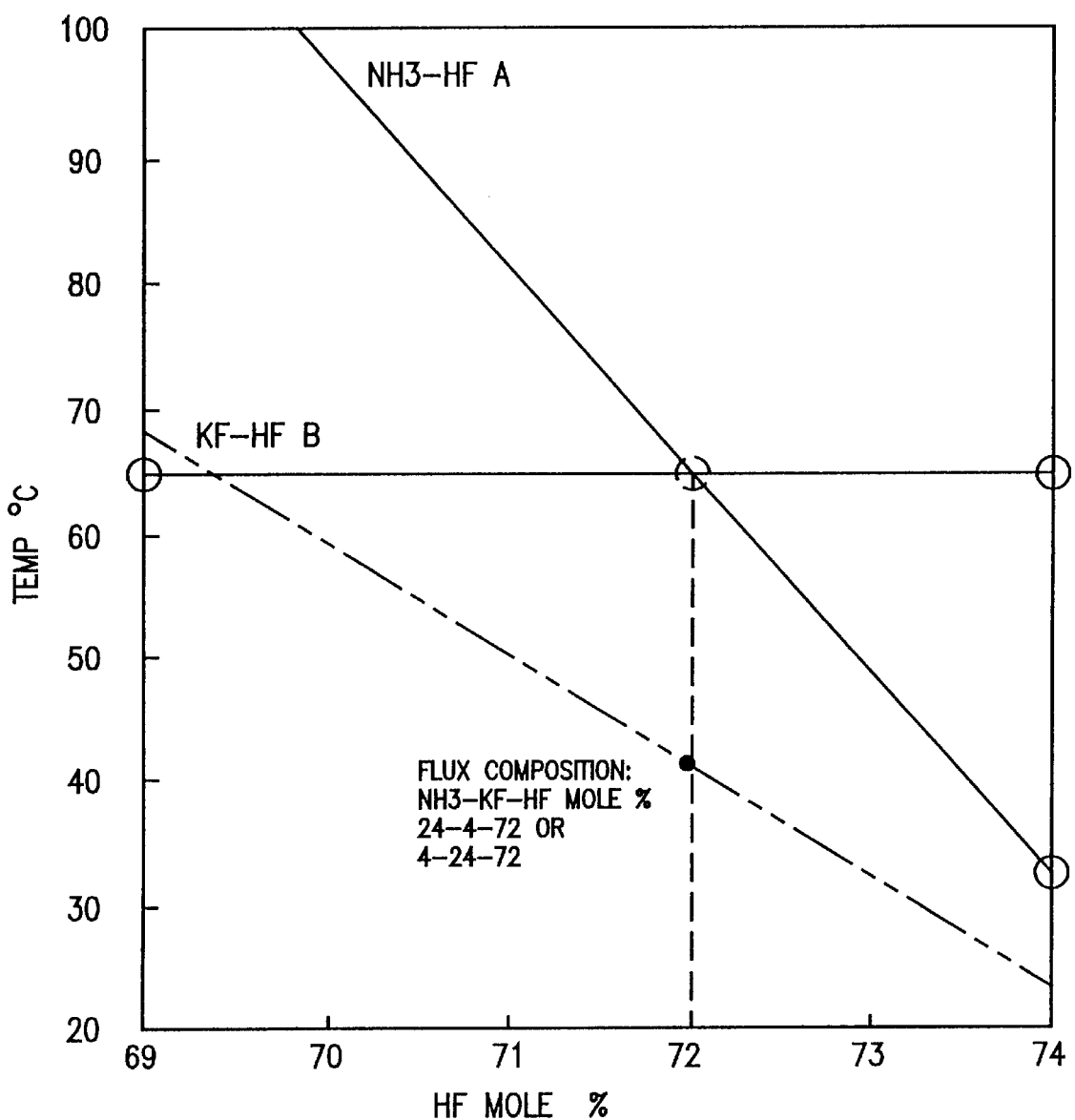
FIG. 6 is a phase diagram showing system composition versus melting point of the molten flux system used in the process.

Nitrogen trifluoride ($NF_3$) gas 30 is produced by contacting fluorine ($F_2$) gas 26 with a flux of ammonia acid mineral fluoride which is molten flux 20 in the reactor 200 at a temperature in the range of 100 to 200° C. (degrees centigrade), preferably in the range of 130 to 160° C. (degrees centigrade). As shown in FIG. 6, the mole fraction of hydrogen fluoride (HF) gas 28 contained in this molten flux 20 is in the range of 65 to 75%, preferably in the range of 71 to 73%. When the reaction takes place, between 1 mole of ammonia ($NH_3$) gas 22 and 3 moles of fluorine ($F_2$) gas 26 are consumed, and 1 mole of nitrogen trifluoride ($NF_3$) gas 30 and 3 moles of hydrogen fluoride (HF) gas 28 are generated. The concentration of hydrogen fluoride (HF) gas 28 increases from the reference point, from before the reaction takes place to after the reaction, by three (3) moles. The temperature of the reaction is in the range of 130 to 160° C. (degrees centigrade). The volatility of hydrogen fluoride (HF) gas 28 is substantially high and significant amounts of hydrogen fluoride (HF) gas 28 are carried out of reactor 200 together with the nitrogen trifluoride ($NF_3$) gas 30.

In the nitrogen trifluoride reactor 200 there are four (4) stream flows consisting of two (2) inlet pipes 206 and 208, and two outlet pipes 207 and 280. Inlet pipe 206 connected to the reactor 200 carries the molten flux 20 with ammonia acid mineral fluoride, rich in ammonia ($NH_3$) 22, at a temperature of 100 to 120° C. (degrees centigrade). The concentration of hydrogen fluoride (HF) 28 in the molten flux 20 coming from inlet pipe 206 is greater than 65 mole %.

Inlet pipe 208 entering the reactor 200 supplies a fluorine ($F_2$) gas stream 26 that carries mainly molecular fluorine ($F_2$) gas 26 but also some other products such as helium (He) gas 24, hydrogen fluoride (HF) gas 28 and nitrogen fluorides. The amount of fluorine ($F_2$) gas 26 from inlet pipe 208 is sufficient to react with all of the ammonia ($NH_3$) gas 22 added into the reactor from inlet pipe 206. The temperature of the fluorine ($F_2$) gas 26 is mainly the temperature of the electrolyzer molten flux 20 being between 50 to 70° C. (degrees centigrade).

Outlet pipe 207 carries the molten flux 20 of ammonia acid mineral fluoride that is weak in ammonia ($NH_3$) concentration 22 to the hydrogen fluoride solubilizer 300. The concentration of hydrogen fluoride (HF) 28 in the molten flux 20 of ammonia acid mineral fluoride is greater than 65 mole % but less than 75 mole %. The temperature of this molten flux stream in the nitrogen trifluoride reactor 200 is in the range of 130 to 160° C. (degrees centigrade).

The concentration of fluorine ($F_2$) gas 26 injected into the reactor has to be in excess from the inlet to the outlet of the reactor. If fluorine ($F_2$) gas 26 is in excess and the reactor operates under a pressure of 5 atm, the quality of the nitrogen trifluoride ($NF_3$) gas product 30 increases significantly: by contacting fluorine ($F_2$) gas 26 with nitrogen trifluoride ($NF_3$) gas 30 containing impurities such as dinitrogen difluoride ($N_2F_2$) and tetrafluorohydrazine ($N_2F_4$) under a pressure of about 5 atm., the impurities are reduced.

By keeping the reactor with fluorine ($F_2$) 26 in excess with respect to ammonia ($NH_3$) 22 (ammonia<⅓ of fluorine), with the pressure kept positive (about 6 atm.), and the temperature at about 140° C. (degrees centigrade), nitrogen trifluoride ($NF_3$) gas 30 is generated free of nitrogen fluoride impurities.

The demister section 228 stops any mist carried with the gaseous mixture. If the gaseous mixture contains any dinitrogen difluoride ($N_2F_2$) and/or tetrafluorohydrazine ($N_2F_4$), and fluorine ($F_2$) gas 26 in addition to the nitrogen trifluoride ($NF_3$) gas 30 generated in the nitrogen trifluoride reactor 200, the impurities react with fluorine ($F_2$) gas 26 as a function of pressure and temperature. The nitrogen trifluoride ($NF_3$) gas 30 also carries hydrogen fluoride (HF) gas 28 trace, as well as trace concentrations of fluorides of nitrogen, such as dinitrogen difluoride ($N_2F_2$), tetrafluorohydrazine ($N_2F_4$), and inert. There may be some other impurities present (because of raw materials) such as $CO_2$, CO, $NO_x$, $CF_4$, and $SF_6$, but all these impurities are at a very low part per million (ppm) level. As is described in the previous paragraph, the nitrogen trifluoride reactor 200 that generates nitrogen trifluoride ($NF_3$) gas 30 has two streams that are entering the reactor: one being the molten flux 20 and the other the fluorine ($F_2$) gas 26 via inlet pipes 206, and two streams exiting the reactor: one being the molten flux 20 and the other being the nitrogen trifluoride ($NF_3$) gas 30 stream via outlet pipes 207 and 280, respectively.

HYDROGEN FLUORIDE SOLUBILIZER 300

Molten flux 20 via outlet pipe 207 from the nitrogen trifluoride reactor 200 is the feed stream to the hydrogen fluoride solubilizer 300. Outlet pipe 207 carries the molten flux 20 of ammonia acid mineral fluoride to the flux tank section 302 of hydrogen fluoride solubilizer 300. The concentration of hydrogen fluoride (HF) 28 in this stream is greater than 65% and less than 75%. The temperature of the molten flux 20 is in the range of 140 to 160°0 C. (degrees centigrade).

Inlet pipes 316a and 316b supply helium (He) and hydrogen fluoride (HF) gases 24 and 28, respectively, and any other condensate material that can be carried with the helium (He) carrier gas 24, to connections 316a, 316b, 316c, and 316d of the hydrogen fluoride solubilizer 300. The temperature of the hydrogen fluoride (HF) 28 and helium (He) 24 gas streams are in the range of minus (−) 40 to minus (−) 80° C. (degrees centigrade). The amount of hydrogen fluoride (HF) gas 28 carried by this stream via pipe 380 is equal to or less than the stoichiometric amount required to make the necessary fluorine ($F_2$) gas 26 for the process.

The other stream via outlet pipe 306 of the hydrogen fluoride solubilizer 300 carries molten flux 20 out to the electrolyzer 400. The temperature of this molten flux 20 stream is in the range of 50 to 70° C. (degrees centigrade). The molten flux 20 carried out of outlet pipe 306 is rich in hydrogen fluoride (HF) 28 but with a concentration of less than 75 mole %.

NITROGEN TRIFLUORIDE/HYDROGEN FLUORIDE CONDENDER 500

Section 228 is connected to the top of the nitrogen trifluoride reactor 200. The nitrogen trifluoride ($NF_3$) and hydrogen fluoride (HF) gases 30 and 28 pass through a condenser cooling zone 508 at a temperature range of 130 to 160° C. (degrees centigrade) where the gas velocity is 1 foot per second or less. The nitrogen trifluoride ($NF_3$) and hydrogen fluoride (HF) gases 30 and 28 that enter the nitrogen trifluoride/hydrogen fluoride condenser 500 are such that the temperature of the nitrogen trifluoride ($NF_3$) gas 30 and other gaseous compounds are lowered by cooling to a dry ice temperature, minus (−) 80° C. (degrees centigrade), inside the condenser 500 by cooling tubes 508. The majority of the hydrogen fluoride (HF) gas 28 that comes from outlet pipe 280 is condensed and collected from condenser 500.

All of the hydrogen fluoride (HF) gas 28 condensing in the nitrogen trifluoride/hydrogen fluoride condenser 500 is transferred to the hydrogen fluoride solubilizer 300 through outlet pipe 506. Outlet pipe 280 carries the nitrogen trifluoride ($NF_3$) product 30 with condensible impurities that condensed in the nitrogen trifluoride/hydrogen fluoride condenser 500.

Section 228 from bottom to top has a temperature range of 140 to 100° C. (degrees centigrade), and the linear velocity of the gases in section 228 is less than 1 ft/sec.; the preferential range is 0.3 to 0.6 ft/sec.

FLUORINE ELECTROLYZER 400

Outlet pipe 306 from the hydrogen fluoride solubilizer supplies molten flux 20 to the fluorine electrolyzer 400. The temperature of molten flux 20 entering into the fluorine electrolyzer 400 is in the range of 50 to 70° C. (degrees centigrade). The electrolyte solution coming from outlet pipe 306 is greater than 65 mole %. The electrolyte from molten flux 20 has the proper composition of ammonia acid mineral fluoride for the necessary conductivity in the electrolysis of hydrogen fluoride (HF) 28 component which is a low voltage without large amounts of heat dissipation.

Outlet pipe 422 of electrolyzer 400 carries the hydrogen ($H_2$) gas 32 product of the electrolysis to the hydrogen/hydrogen fluoride condenser 600. Inlet pipe 208 carries the fluorine ($F_2$) gas 26 generated by the electrolyzer 400 with some nitrogen fluorides which are injected to the nitrogen trifluoride reactor 200.

Pipe 104 carries out molten flux 20 that is electrolyte weak in hydrogen fluoride (HF) 28. The ammonia acid mineral fluoride solution of flux 20 is transferred to the ammonia solubilizer 100. The molten flux 20 has a temperature range between 50 to 70° C. (degrees centigrade).

Molten flux 20 is a mineral acid solvent used in this process to perform a number of functions. It provides the electrolysis of hydrogen fluoride (HF) 28 that forms fluorine ($F_2$) and hydrogen ($H_2$) gases 26 and 32, respectively. In addition, the electrolyte is a solvent that absorbs the injected ammonia ($NH_3$) gas 22 to enrich itself and a solvent that absorbs injected hydrogen fluoride (HF) gas 28 to enrich itself. It also provides a reaction medium to produce nitrogen trifluoride ($NF_3$) gas 30.

Molten flux 20 is an electrolyte system of ammonia ($NH_3$) 22, potassium fluoride (KF) 34, and hydrogen fluoride (HF) 28. In order to prevent crystallization or solid formation in molten flux 20, the melting point has to be achieved. The melting point curve has to be determined in order to determine the range of operation for this process. This molten flux 20 system is composed of three components that are soluble and react with each other. By using known data of the melting points of ($NH_3$—HF) and (KF—HF) systems, the molten flux 20 melting point can be achieved, as shown in FIG. 6.

For all practical purposes each of the systems mentioned ($NH_3$—HF) and (KF—HF) is a two component system. System ($NH_3$—HF) is derived from ammonia ($NH_3$) 22 and hydrogen fluoride (HF) 28. System (KF—HF) is derived from potassium fluoride (KF) 34 and hydrogen fluoride (HF) 28. Molten flux 20 is a new three component system derived from the ($NH_3$—HF) and (KF—HF) systems being ammonia ($NH_3$) 22, potassium fluoride (KF) 34 and hydrogen fluoride (HF) 28 in an anhydrous system thereof.

The molten flux 20 runs through the entire system. The reactor 200 and the electrolyzer 400 are the critical zones of this process. When the molten flux 20 flows through the reactor 200, the ammonia ($NH_3$) component 22 has to be of a sufficient quantity to react with all of the injected fluorine ($F_2$) gas 26 to form nitrogen trifluoride ($NF_3$) gas 30. The temperature has to be sufficiently high to prevent any by-product formation. When the molten flux 20 (electrolyte) runs through the electrolyzer, proper electro-conductivity and temperatures are required.

The electro-conductivity of molten flux 20 (electrolyte-liquid medium) has to be sufficient so that the resistance between electrodes is minimum. If the molten flux 20 achieves high electro-conductivity, the life of the electrolyzer is preserved due to the small amount of heat being generated.

The electrolyte flux 20 is maintained free of water (moisture) from any source. The presence of water can create problems such as explosions. The temperature of molten flux 20 (electrolyte-liquid medium) has to be sufficiently high to keep the electrolyte free of crystallization or solid formation; and sufficiently low to preserve the life of the electrolyzer. To prevent crystallization or solid formation, the electrolyte flux 20 must be 15° C. (degrees centigrade) above the melting point of the electrolyte.

By knowing the melting point curves of the systems $NH_3$—HF and KF—HF, as shown in FIG. 6, the melting point curve of the molten flux 20 or electrolyte system can be obtained. The intersection of curves A and B indicates the common melting point and HF mole % of the two systems ($NH_3$—HF and KF—HF). The common component in the two systems ($NH_3$—HF and KF—HF) is hydrogen fluoride (HF) 28. This melting point curve of the molten flux 20 system is lower than either of the two $NH_3$—HF and KF—HF systems. These systems $NH_3$—HF and KF—HF have a common melting point of 64° C. (degrees centigrade) at a hydrogen fluoride (HF) 28 concentration of 72 mole %. By using the common melting point of the above two systems, the correlation of the melting point curve for the molten flux 20 system can be established, as depicted in FIG. 6.

The systems ($NH_3$—HF) and (KF—HF) provide sufficient electro-conductivity at a hydrogen fluoride (HF) 28 concentration of 72 mole %. Since 72 mole % of hydrogen fluoride (HF) 28 achieves the proper electro-conductivity, a 4 mole % range of hydrogen fluoride (HF) 28 is established being 2.0% above and below 72% mole of hydrogen fluoride (HF) 28. By combining the data of the two systems ($NH_3$—HF) and (KF—HF), and the range of operation (±2% mole from reference point 72% mole of HF), the molten flux 20 system for processing nitrogen trifluoride (NF$_3$) gas 30 is obtained.

Ten different compositions of the three components (NH$_3$, HF, KF) that form molten flux 20 have been derived. In order to obtain the melting point curve of molten flux 20, the melting points of the ten different compositions are observed in Table 1.

TABLE 1

MELTING POINT OF MOLTEN FLUX SYSTEM
Experimental Melting Point of Molten Flux System
NH3-KF-HF

| Run | Mole % | | | Temperature in ° C. |
|---|---|---|---|---|
| | HF | NH$_3$ | KF | Average Reading |
| 1 | 71 | 20.5 | 8.5 | 39 |
| 2 | 72 | 20 | 8 | 33 |
| 3 | 69.7 | 21.1 | 9.2 | 48 |
| 4 | 69 | 21.5 | 9.5 | 51 |
| 5 | 69.8 | 20.6 | 9.6 | 47 |
| 6 | 72 | 19.9 | 8.2 | 32 |
| 7 | 68.3 | 22.3 | 9.4 | 58 |
| 8 | 76 | 20 | 4 | 14 |
| 9 | 72 | 0 | 28 | 64 |
| 10 | 72 | 28 | 0 | 64 |

HYDROGEN/HYDROGEN FLUORIDE CONDENSER 600

Outlet pipe 422 carries out the hydrogen (H$_2$) gas 32 and hydrogen fluoride (HF) gas 28 from the electrolyzer 400 and these gases pass through the hydrogen/hydrogen fluoride condenser 600. The hydrogen fluoride (HF) gas 28 from outlet pipe 422 condenses and is transferred back into the condenser zone 602 to the electrolyzer 400 through outlet pipe 606.

The main function of the hydrogen/hydrogen fluoride condenser 600 is the removal of hydrogen fluoride (HF) gas 28 from pipe 422 carrying the hydrogen (H$_2$) and hydrogen fluoride (HF) gas streams 32 and 28, respectively.

AMMONIA SOLUBILIZER 100

Inlet pipe 104 carries molten flux 20 into the ammonia solubilizer 100 at a temperature in the range of 140 to 160° C. (degrees centigrade). The ammonia (NH$_3$) gas 22 is solubilized or dissolved in the molten flux 20 (ammonia acid mineral fluoride) while helium (He) gas 24 passes through the molten flux 20. The helium (He) gas 24 prevents plugging of the sparger with the ammonium fluoride (NH$_4$F) solid 36. The molten flux 20 is rich in ammonia (NH$_3$) 22 and is transferred into the reactor 200 at a temperature between 120 and 130° C. (degrees centigrade).

The steps described above constitute the process for the manufacturing of nitrogen trifluoride (NF$_3$) gas 30 in accordance with the present invention, as shown in FIGS. 1 through 6 of the drawings.

ADVANTAGES OF THE PRESENT INVENTION

Accordingly, an advantage of the present invention is that it provides for an efficient process and apparatus for continuously and automatically producing nitrogen trifluoride (NF$_3$) and hydrogen (H$_2$) from ammonia (NH$_3$) and hydrogen fluoride (HF) using a single molten flux.

Another advantage of the present invention is that it provides for a process which is continuous, controllable and automated such that the nitrogen trifluoride (NF$_3$) is obtainable without product deterioration (a high quality product is produced) and without any by-products being produced since they are undesirable.

Another advantage of the present invention is that it provides for a high purity and a high quality nitrogen trifluoride (NF$_3$) and hydrogen (H$_2$) which is free from contaminates and impurities such as dinitrogen fluoride (N$_2$F$_2$), tetrafluorohydrazine (N$_2$F$_4$), nitrogen oxides (NO$_x$), or solid ammonium fluoride (NH$_4$F).

Another advantage of the present invention is that it provides for a system including an electrolyzer, a reactor vessel and solubilizer connected together so that a molten flux liquid flows through them continuously, and wherein ammonia (NH$_3$) and hydrogen fluoride (HF) are introduced into the system and nitrogen trifluoride (NF$_3$) and hydrogen (H$_2$) are produced by the system.

Another advantage of the present invention is that it provides for a molten flux containing ammonia (NH$_3$), a metal fluoride (MF$_x$) such as potassium fluoride (KF), and hydrogen fluoride(HF), at molar ratios of approximately (NH$_3$+MF)∶HF∶∶4∶10, respectively.

Another advantage of the present invention is that it provides an apparatus with two flux loops, one loop operates at a low pressure (atmospheric), and the other loop operates in a range of pressures.

Another advantage of the present invention is that it provides an apparatus in which the loop that operates under pressure generates nitrogen trifluoride free of impurities:

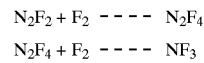

Another advantage of the present invention is that it provides an apparatus that eliminates the impurities of nitrogen fluorides without generating nitrogen (N$_2$).

Another advantage of the present invention is that it provides for a nitrogen trifluoride reactor apparatus having cooling components contained therein for removing the exothermic heat of reaction (ΔT) of the process, and heater components for heating the molten flux to proper temperature range to avoid explosions and provide a safe process.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. Apparatus for the production of nitrogen trifluoride (NF$_3$), starting with a molten flux including at least ammonia (NH$_3$), a metal fluoride, and hydrogen fluoride (HF), comprising:

a) an electrolyzer vessel having a first section for receiving said molten flux and having at least one cathode for producing hydrogen (H$_2$) gas and having at least one anode for producing fluorine (F$_2$) gas, a second section for collecting hydrogen (H$_2$) gas, and a third section for collecting fluorine (F$_2$) gas;

b) an ammonia solubilizer having a molten flux tank with first inlet means connected to the electrolyzer vessel for receiving said molten flux, said molten flux tank having first outlet means connected to a nitrogen trifluoride reactor for transferring said molten flux to said nitrogen trifluoride reactor, said ammonia solubilizer having second inlet means for receiving ammonia ($NH_3$) gas and having second outlet means for equalizing the pressure to said nitrogen trifluoride reactor;

c) a hydrogen fluoride solubilizer having a molten flux tank with first inlet means connected to the nitrogen trifluoride solubilizer for receiving said molten flux, said molten flux tank having first outlet means connected to said electrolyzer vessel for transferring said molten flux to said electrolyzer vessel, said hydrogen fluoride solubilizer having second inlet means for receiving hydrogen fluoride (HF) and a carrier gas recycle and having second outlet means for supplying said carrier gas recycle to said electrolyzer; and d) a nitrogen trifluoride reactor having a molten flux tank with first inlet means connected to the first outlet means of said ammonia solubilizer for receiving said molten flux therefrom, said molten flux tank having first outlet means connected to the first inlet means of said hydrogen flouride solubilezer for transferring said molten flux thereto, said nitrogen trifluoride reactor having second inlet means connected to said compressor for receiving fluorine ($F_2$) gas therefrom and said second inlet means including means for simultaneously supplying said fluorine ($F_2$) gas and said carrier gas to said nitrogen trifluoride reactor, and second outlet means for supplying nitrogen trifluoride ($NF_3$) produced in said nitrogen trifluoride reactor to a condenser for recovery of nitrogen trifluoride ($NF_3$) and hydrogen fluoride (HF);

e) a closed nitrogen trifluoride flux loop for producing nitrogen trifluoride ($NF_3$) gas including said ammonia solubilizer and said nitrogen trifluoride reactor; and f) a closed fluoride flux loop for producing fluorine ($F_2$) gas including said hydrogen fluoride solubilizer and said electrolyzer vessel.

2. Apparatus in accordance with claim 1, wherein said ammonia solubilizer, said hydrogen fluoride solubilizer, and said nitrogen trifluoride reactor each include one or more baffles for increasing the mixing contact and retention time with said molten flux and to transfer heat relative to said molten flux.

3. Apparatus in accordance with claim 1, wherein said ammonia solubilizer, said hydrogen fluoride solubilizer, and said nitrogen trifluoride reactor each includes one or more distributor plate and sparger for supplying gases to said molten flux contained therein.

4. Apparatus in accordance with claim 1, wherein said hydrogen fluoride solubilizer includes one or more baffles which form two compartments and allow a temperature gradient to exist in said two compartments, and said hydrogen fluoride solubilizer further includes cooling tubes for further removing heat from said hydrogen fluoride solubilizer.

5. Apparatus in accordance with claim 1, wherein the hydrogen fluoride generated in the nitrogen trifluoride reactor can be separated and transferred to the hydrogen fluoride solubilizer.

6. Apparatus in accordance with claim 1, wherein said ammonia solubilizer, said hydrogen fluoride solubilizer, and said nitrogen trifluoride reactor each includes one or more cooling tubes for removing heat from said molten flux contained therein.

7. Apparatus in accordance with claim 1, wherein said electrolyzer vessel includes at least one baffle for forming said second and third sections, a membrane in said first section connected to said baffle through which said molten flux passes, a plurality of cathodes on one side of said membrane for producing hydrogen gas ($H_2$), and a plurality of anodes on the other side of said membrane for producing fluorine gas ($F_2$).

8. Apparatus in accordance with claim 1, wherein said electrolyzer includes first and second baffles for forming two sections for collecting hydrogen ($H_2$) gas and one section for collecting fluorine ($F_2$) gas, first and second membranes in said first section connected respectively to said first and second baffles through which said molten flux passes, a plurality of cathodes on one side of said first and second membranes for producing hydrogen gas ($H_2$), and a plurality of anodes on the other side of said first and second membranes for producing fluorine gas ($F_2$).

9. Apparatus in accordance with claim 1, wherein said ammonia solubilizer, said hydrogen fluoride solubilizer, and said nitrogen trifluoride reactor have portions thereof made of nickel or nickel alloy.

10. Apparatus in accordance with claim 1, further including a condenser for recovery of hydrogen ($H_2$) and hydrogen fluoride (HF) gases from said electrolyzer.

11. Apparatus in accordance with claim 1 which operates in two loops mode, the fluorine loop operates at low pressure, and the nitrogen trifluoride loop operates at a higher pressure.

12. An apparatus in accordance with claim 11, wherein said fluorine loop operates in the range of 1 to 10 atmospheres.

13. Apparatus in accordance with claim 1 has a reactor (nitrogen trifluoride reactor) with internal packing that causes the two phase flow to yaw in its path as it moves through the packing section.

14. An apparatus in accordance with claim 1, wherein said nitrogen trifluoride flux loop further includes a storage overflow tank for holding said molten flux located between said nitrogen trifluoride reactor and said ammonia solubilizer.

15. An apparatus in accordance with claim 1, wherein said nitrogen trifluoride flux loop operates at a positive pressure.

16. Apparatus in accordance with claim 14, wherein said nitrogen trifluoride loop operates in the range of 1 to 10 atmospheres.

17. An apparatus in accordance with claim 1, wherein said fluoride flux loop operates at a pressure of 1 atmosphere.

* * * * *